United States Patent
Lansbarkis

[11] Patent Number: 6,074,460
[45] Date of Patent: Jun. 13, 2000

[54] ANALYSIS OF VOLATILE ORGANIC COMPOUNDS IN WATER AND AIR USING ATTAPULGITE CLAYS

[75] Inventor: James R. Lansbarkis, El Dorado, Calif.

[73] Assignee: UOP LLC, Des Plaines, Ill.

[21] Appl. No.: 09/166,255

[22] Filed: Oct. 5, 1998

[51] Int. Cl.[7] .......................... B01D 53/04; B01D 53/26
[52] U.S. Cl. .................. 95/120; 95/126; 95/143; 95/148
[58] Field of Search ............... 95/143–148, 106, 95/115, 117–120, 126; 96/108, 144, 146

[56] References Cited

U.S. PATENT DOCUMENTS

| | | | |
|---|---|---|---|
| 2,965,687 | 12/1960 | Roberts et al. | 95/147 |
| 3,049,449 | 8/1962 | Allegrini | 131/17 |
| 3,142,547 | 7/1964 | Marsh et al. | 95/143 X |
| 3,252,270 | 5/1966 | Pall et al. | 95/143 |
| 3,834,125 | 9/1974 | Richter, Jr. | 96/146 |
| 4,205,967 | 6/1980 | Sandman et al. | 95/148 X |
| 4,316,813 | 2/1982 | Voss | 252/189 |
| 4,326,858 | 4/1982 | Benkmann | 95/143 X |
| 4,636,227 | 1/1987 | Yin et al. | 96/108 X |
| 4,749,384 | 6/1988 | Nowobilski et al. | 95/143 X |
| 4,875,910 | 10/1989 | Dunnigan et al. | 55/74 |
| 5,415,682 | 5/1995 | Zarchy et al. | 95/143 X |
| 5,512,083 | 4/1996 | Dunne | 96/144 X |
| 5,536,301 | 7/1996 | Lansbarkis et al. | 95/117 |
| 5,587,084 | 12/1996 | Boyd et al. | 95/144 X |

OTHER PUBLICATIONS

EPA Method 524.2 (undated).
Method TO–14, Determination of Volatile Organic Compounds (VOCs) in Ambient Air Using SUMMA® Passivated Canister Sample and Gas Chromatographic Analysis (undated).
Compendium Method TO–17, Compendium of Methods for the Determination of Toxic Organic Compounds in Ambient Air, Second Edition; Determination of Volatile Organic Compounds in Ambient Air Using Active Sampling Onto Sorbent Tubes, Jan. 1997.

Primary Examiner—Robert Spitzer
Attorney, Agent, or Firm—John G. Tolomei; Frank S. Molinaro; Maryann Maas

[57] ABSTRACT

The purge and trap procedure commonly used for analysis of volatile organic compounds in water or air can be significantly improved using traps employing clays and modified clays as adsorbents. Examples of clays include attapulgite clay, attapulgite clay modified with tetrasodiumpyrophosphate, carboxymethylcellulose and the combination thereof, kaolin clay, kaolin clay modified with tetrasodiumpyrophosphate, carboxymethylcellulose or the combination thereof, and mixtures of the above clays.

4 Claims, 1 Drawing Sheet

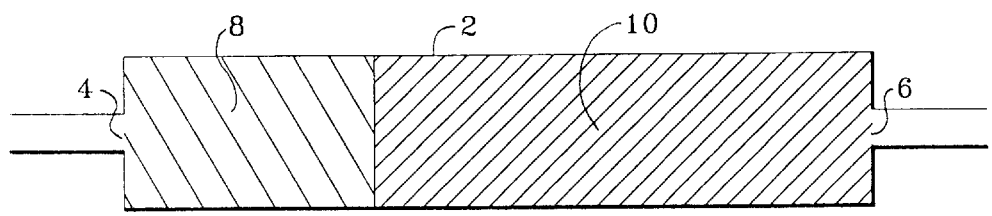

ANALYSIS OF VOLATILE ORGANIC COMPOUNDS IN WATER AND AIR USING ATTAPULGITE CLAYS

FIELD OF THE INVENTION

The present invention involves using clays such as attapulgite clay and modified attapulgite clays as the adsorbent in purge and trap sorbent tubes.

BACKGROUND OF THE INVENTION

With the heightened environmental concern regarding the presence of contaminants in drinking water it has become necessary to analyze water for volatile organic compounds. The purge and trap technique is a general purpose method for the identification and simultaneous measurement of purgable, volatile organic compounds in water that have sufficiently high volatility and sufficiently low water solubility to be efficiently removed from water. Among the volatile organic compounds which can be determined by the purge and trap procedure are benzene, bromobenzene, carbon tetrachloride, chloroform, cumene, naphthalene, styrene, toluene, the xylenes, vinyl chloride, tetrachloroethylene, hexachlorobutadiene, methylene dichloride and fluorodichloromethane. An analogous technique also is used for the analysis of volatile organic compounds in air.

In a typical purge and trap procedure, exemplified by EPA Method 524.2, volatile organic compounds and surrogates with low water solubility are purged (extracted) from the sample by bubbling an inert gas through the aqueous sample. Purged sample components are trapped in a tube containing suitable sorbent materials. When purging is complete, the sorbent tube is heated and backflushed with helium to desorb the trapped sample components into a capillary gas chromatography (GC) column interfaced to a mass spectrometer (MS). The column is temperature programmed to separate the analytes which are then detected with the MS. Compounds eluting from the GC column are identified by comparing their measured mass spectra and retention times to reference spectra and retention times in a database. Reference spectra and retention times for analytes are obtained by the measurement of calibration standards under the same conditions used for samples. A concentration of each identified component is measured by relating the MS response of the quantitation ion produced by that compound to the MS response of the quantitation ion produced by a compound that is used as an internal standard. Surrogate analytes, whose concentrations are known in every sample, are measured with the same internal standard calibration procedure.

The foregoing description was for the analysis of volatile organic materials in aqueous systems where the purge and trap technique is appropriate. However, it should be clear that an analogous procedure may be utilized for the analysis of volatile organic materials in, e.g., air analysis. The exposition within will be directed with particularity to analysis of volatile organics in aqueous media using the purge and trap procedure, but this is done solely for clarity and ease of exposition. It needs to be clearly understood that the subject matter is not restricted to such analyses and is capable of significant expansion.

This application focuses on the sorbent tubes used in purge and trap analysis. In particular, our goal is the development of an improved sample concentration sorbent tube, superior to those presently available, to enhance the purge and trap procedure itself, both as to its methodology and its results.

The jet separator specified in, for example, EPA Method 524.2 for analysis using a GC/MS system can cause losses of 50% or more for small analytes, a condition alleviated somewhat by interfacing the column directly to a MS ion source. Elimination of the jet separator requires low column flow rates, which are not compatible with flow rates in purge and trap systems. Another option for improving sensitivity is the use of larger samples. Since both of these options have significant disadvantages, a sorbent tube that is considerably more efficient than those commonly used is needed.

Present adsorbents in the sorbent tubes used for purge and trap methodology appear to be one or more of various charcoals or porous carbons, organic polymers such as that of 2,6-diphenylene oxide (e.g., Tenax®), and silica gels. Each individually and even in combination suffer from distinct limitations and disadvantages. One disadvantage is that of limited capacity, so that "saturation" of the adsorbent is all too readily attained, leading to error in analytic results. Each also suffers from a lack of thermal stability, with temperatures of about 200° C. or greater likely to lead to irreversible impairment as an adsorbent. Each additionally suffers from hysteresis or "memory" effects, i.e., complete desorption of some components may be difficult with additional desorption occurring during subsequent analyses using the same sorbent tube in a different purge cycle. This is frequently referred to as "carryover."

Perhaps the most severe limitation of materials commonly used as adsorbents in purge and trap methods is their very limited linearity. That is, the adsorbents typically utilized by those in the art discriminate among the various classes of organic materials which may be present, and also may discriminate among the organic materials within a class. Thus, a substantial proportion of analysis time must be spent in calibrating sorbent tubes for their nonlinearity. Therefore, adsorbents which are linear, or nearly so, with respect to the adsorption, storage and desorption of a broad spectrum of organic components over a wide dynamic concentration range are desired.

Although the present invention is simple, it is an extraordinarily effective solution to the foregoing problems. The present invention demonstrates that when the sorbent tubes of the purge and trap unit contain clays such as attapulgite clay and/or modified attapulgite clays as adsorbents, semi-volatile organic compounds found in contaminated water can be effectively and efficiently adsorbed. Furthermore, the capacity of these clays as adsorbents in sorbent tubes mandated for use by the EPA is sufficient so that "breakthrough" through saturation by components at high concentrations is rarely a threat. Complete desorption of all components is readily attained with avoidance of hysteresis effects since substantially higher desorption and bakeout temperatures are available as compared to the commonly-used sorbent tube materials thereby eliminating analytical errors arising from materials remaining in a sorbent tube from prior analyses. The resulting benefit is better run-to-run reproducibility and a higher precision in measurement evidenced by a lower relative standard error of deviation. Another benefit is longer sorbent tube lifetime. That is, the attapulgite clay adsorbents can undergo more adsorb-desorb cycles than those in the sorbent tubes commonly in commercial use. But most importantly is that the sorbent tubes of the present invention exhibit linearity in absorption, linearity in storage, and linearity in desorption, and exhibit such linearity over a dynamic range that easily spans four orders of magnitude. Thus calibration becomes an infrequent occurrence. These cumulative benefits are substantial and offer advantages over the prior art sorbent tubes which are advantages in kind rather than advantages in degree.

SUMMARY OF THE INVENTION

The purpose of this invention is to make possible the analysis of volatile organic compounds in water or air by a purge and trap procedure using clays as adsorbent materials which show linearity in adsorption, storage, and desorption of the organic compounds over a wide dynamic concentration range, with a high capacity, and little or no hysteresis. An embodiment comprises utilizing as a trap in classical purge-and-trap procedures an adsorbent which is a clay, a modified clay, or a combination thereof. In a specific embodiment the clay is attapulgite, tetrasodiumpyrophosphate-modified attapulgite, carboxymethylcellulose-modified attapulgite, or a mixture thereof.

BRIEF DESCRIPTION OF THE DRAWING

The FIGURE is a simplified side view of the sorbent tube of the invention having a bed of an adsorbent to adsorb water vapor and a bed of attapulgite clay. Additional pieces of apparatus that may be employed in connection with the apparatus of the invention are not shown.

DESCRIPTION OF THE INVENTION

The present invention relates to the deployment of well-known materials as adsorbents in a particular field of use. Although the materials themselves have been recognized as adsorbents and binders for adsorbents in other applications, they have not been used as adsorbents for the purge and trap procedures used in the analysis of organic compounds present in water and in air. Although the analysis of trace organic components in aqueous streams by a combination of gas chromatography and mass spectrometry has for some time suffered from the limitations of, e.g., silica, porous carbon, and organic polymers as adsorbents, few substitutes have been commercially offered. We now describe an alternative which is extraordinarily effective, for it makes possible a procedure with enhanced linearity, greater reproducibility and precision, decreased carryover adversely affecting analytical accuracy, less frequent calibration, and longer operational material lifetime.

The present advancement in purge and trap procedures is the employment of clays and modified clays as adsorbents to replace, partially or preferably totally, the current common adsorbents. Perhaps the most outstanding feature of the clays and modified clays of this invention as adsorbents compared to the current state of the art is heir linearity. That is, the clays and modified clays adsorb, store and desorb a wide range of organic species in proportionately equal amounts; there is a one-to-one correspondence between the incoming organic species and the desorbed species. This linearity is independent of the mix of organic materials up to the adsorbent saturation point, and linearity is maintained over a dynamic range of better than $10^4$, often from 0.5 ppb up to 100 ppm, with linearity over this range of less than 5%. In comparison, current sorbent tube materials, such as silica gel, carbon in its various forms, and organic polymers such as polyethers, exhibit variable linearity depending upon the batch of material used, the thermal history of the adsorbent, and the mixture of the adsorbed species. In part the current commercial materials exhibit nonlinearity because their structures may change with temperature cycling, whereas the clays and modified clays disclosed herein are quite stable to temperature cycling.

An associated benefit of the high thermal stability of the clays and modified clays is that both a high desorption temperature and an even higher bakeout temperature can be employed. High desorption temperatures tend to promote a linear response and also promote short desorption times, thereby reducing analysis time. Because the desorption temperature is inversely proportional to the concentration of material remaining on the adsorbent, a high bakeout temperature tends to minimize memory and hysteresis effects; bakeout at, e.g., it is common to use 500° C. which tends to remove all adsorbed species from the sorbent tube in a reasonably short time.

The adsorbents which are used in the present advanced sorbent tubes are clays that are neutral, slightly acidic, or slightly basic. Strongly basic clays such as hydrotalcite are not successful in the present invention. The preferred clay is attapulgite clay and attapulgite clay modified with tetrasodiumpyrophosphate, carboxymethylcellulose or the combination thereof. Attapulgite is a complex hydrated magnesium aluminum silicate, a colloidally dimensioned mineral having an acicular or lathlike structure; see U.S. Pat. No. 3,049,499 hereby incorporated by reference. It is also expected that kaolin clay and kaolin clay modified with tetrasodiumpyrophosphate, carboxymethylcellulose or the combination thereof would be successful in the present invention. The use of the tetrasodiumpyrophosphate and carboxymethylcellulose modifiers aid in increasing the macroporisity of the clays. Different clays may be used individually or as mixtures. Additional adsorbents may be used in combination with the clays. Examples of other suitable adsorbents include silicalite, dealuminated zeolite Y, and fumed silica. When using dealuminated zeolite Y the degree of dealuminization must be sufficient to cause he material to be mostly hydrophobic and organophilic. The additional adsorbent is chosen to have a high selectivity for the compound of interest. Due to the difference in desorption temperatures of the additional adsorbents and the clays, it is preferred that the additional adsorbent and the clays be located in separate sub-beds. The complexity of two sub-beds results in that embodiment being less preferred. Metal oxides and metal ions such as lithium, sodium and/or potassium can be added or ion exchanged with the silicalite, dealuminated zeolite Y, or fumed silica.

These clays are usually employed as a binder to hold together aggregates of very small particles of zeolitic adsorbent, and the clays have been previously considered to adversely affect the performance of at least zeolitic adsorbents used in purge and trap sorbent tubes. Contrary to prior beliefs, it is demonstrated here that the clays or modified clays themselves are excellent adsorbents for volatile organic compounds.

The conditions under which the clay and/or modified clay-packed sorbent tubes are used in the purge and trap procedure include an adsorption cycle usually conducted at about ambient temperature. Certainly it is possible to cool the adsorbent, but generally adsorption is conducted without significant cooling of the sorbent tube. The desorption cycle is preferably conducted at a temperature as high as is feasible. High temperatures favor linear response, and since the materials of our invention are structurally thermostable, desorption temperatures of about 200° C. to about 500° C. are recommended. However, desorption may be performed over the range from about 50° C. up to about 600° C., even though the aforementioned narrower temperature range encompasses the more usual working conditions of about 250° C. to about 400° C. Excellent linearity in desorption among the members of a broad spectrum of organic materials is observed under these conditions. The desorption temperature is held for a time sufficient to desorb the components of interest. The desorption temperature may be held for about a five minute time period, and typically, the desorption is held for a period of about one to two minutes to allow the adsorbent to become completely heated. Fast desorption is preferred, and it is therefore preferred to hold the desorption temperature for less than one minute.

Residual organic materials are removed from the clays by heating the latter to what is commonly called a bakeout temperature. The higher the bakeout temperature, the lower will be the residual organic materials on the adsorbent, since the desorption rate is an exponential function of the amount of organic material remaining on the adsorbent. Usually the bakeout temperature is substantially greater than the desorption temperature, and for the materials of the present invention a bakeout temperature about 500° C. or higher is common. It is to be emphasized that high bakeout temperatures are integral to the absence of hysteresis and a minimum bakeout temperature of 450° C. is recommended. The maximum bakeout temperature will depend on the thermal stability of the clay or modified clay utilized in the practice of this invention, a property which a skilled artisan can readily determine either from the prior art or by simple experimentation. Generally the maximum bakeout temperature will be at least 700° C., although additional benefits are unlikely above a bakeout temperature of 600° C. The bakeout temperature is held for a time sufficient to desorb the residual organic materials on the adsorbent. The bakeout temperature is generally held for about 5 to about 10 minutes, but can be as little as about 2 minutes depending upon the application.

The clays and modified clays used in the sorbent tubes of the present invention can eliminate or greatly reduce the dry purge step mandated by the EPA protocols, a step which is included there to reduce the amount of water on the adsorbent. Using a molecular sieve highly selective for water over organic compounds can remove the water prior to its contact with the clay adsorbent for volatile organic compounds. The water removing adsorbent can be included either as part of a unitary adsorption tube, with the water removing adsorbent placed prior to, or upstream of, the clay adsorbent, or as a separate bed. Having the water removing adsorbent present as a separate bed has the advantage of not only protecting the clay adsorbent for volatile organic compounds from moisture so as to maximize its capacity for organic materials, but it also permits the bed to be removed from the desorption flow path, thereby keeping moisture from the chromatographic instrument. On the other hand, having the water removing adsorbent as the first bed in the adsorbent tube allows hydrophilic adsorbents to be used, but during the desorption step this water is sent into the chromatographic instrument. For most chromatographic detectors this does not pose a problem.

Turning to the FIGURE, the sorbent tube apparatus of the invention is shown as a vessel 2 having a gas fluid inlet 4 and a gas fluid outlet 6. The vessel may be constructed of any suitable material able to conduct gas at the flow rate, temperature, and pressure of the particular application. The gas fluid inlet and outlet may further be equipped with connectors so that the apparatus may be readily attached to the chromatographic system. Furthermore, the gas fluid inlet and outlet may contain a retainer to prevent the solid contents of the vessel from being removed from the vessel. One bed of attapulgite clay is shown as bed 10 in the FIGURE. The FIGURE also contains the optional bed 8 containing an adsorbent to remove water vapor.

EXAMPLE 20 g Minugel (attapulgite clay), 0.4 g carboxymethylcellulose, 0.2 g tetrasodiumpyrophosphate, and about 120 mL of water was mixed together to form a gelatinous mass. The mass was air dried at 90° C. and calcined to 600° C. at 1° C./min. and held for 1 hour. The resulting 20–50 mesh particles of clay were packed into sorbent tubes.

Most of the compounds of EPA method 524.2 rev 4 were used to evaluate adsorbents for purge and trap applications as 20 ppb solutions (5 mL total). The procedures mandated in the foregoing EPA method were followed. 5 mL of the water standard were introduced into the sparge tube and sparged with helium at a flow rate of 40 mL/min. for 6 minutes. A 30 second dry purge was then initiated, after which the sample was desorbed into the gas chromatograph for 2 minutes.

Similarly, most of the compounds of Methods TO-14, Determination of Volatile Organic Compounds (VOCs) in Ambient Air Using SUMMA® Passivated Canister Sample and Gas Chromatographic Analysis, and most of the compounds of Compendium Method TO-17, Compendium of Methods for the Determination of Toxic Organic Compounds in Ambient Air, Second Edition; Determination of Volatile Organic Compounds in Ambient Air Using Active Sampling Onto Sorbent Tubes were evaluated using sorbent tubes packed with the modified minugel clay described above.

Results are given in the table, with the first column reciting the name of the organic compound tested, and the next three columns indicating whether the component is detectable by methods 524.2-rev.4, TO-14, and TO-17 discussed above. The final column indicates whether the organic compound was detected using the sorbent tubes packed with the modified Minugel clay described above. The value listed in the final column is thousands of area counts per parts-per-billion of the component tested. The results demonstrate the adsorption, storage, and desorption capability of the clay.

TABLE

| Organic Component | 524.2-R4 | TO-14 | TO-17 | Recovered | Area Counts per ppb |
|---|---|---|---|---|---|
| Dichlorodifluoromethane | X | X | X | X | <1 |
| Methylene Chloride | | X | X | X | 57 |
| Vinyl Chloride | X | X | X | X | 23 |
| Bromomethane | X | X | X | X | 10 |
| Chloroethane | X | X | X | X | 17 |
| Chloromethane | X | X | X | X | 23 |
| Chloroform | X | X | X | X | 64 |
| Carbon Tetrachloride | X | X | X | X | 18 |

TABLE-continued

| Organic Component | 524.2-R4 | TO-14 | TO-17 | Recovered | Area Counts per ppb |
|---|---|---|---|---|---|
| Trichlorofluoromethane | X | X | X | X | <1 |
| 1,1-Dichloroethene | X | X | X | X | 118 |
| 3-Chloroprene | X |  | X | X | 6 |
| 1,1-Dichloroethane | X | X | X | X | 44 |
| cis-1,2-Dichloroethene | X | X | X | X | 59 |
| trans-1,2-Dichloroethene | X |  |  | X | 66 |
| 1,2-Dichloroethane | X | X | X | X | 50 |
| 1,1,1-Trichloroethane | X | X | X | X | 174 |
| Benzene | X | X | X | X | 122 |
| 1,2-Dichloropropane | X | X | X | X | 66 |
| Trichloroethene | X | X | X | X | 145 |
| cis-1,3-Dichloropropene | X | X | X | X | 53 |
| trans-1,3-Dichloropropene | X | X | X | X | 54 |
| 1,1,2-Trichloroethane | X | X | X | X | 95 |
| Toluene | X | X | X | X | 128 |
| Tetrachloroethene | X | X | X | X | 90 |
| Chlorobenzene | X | X | X | X | 137 |
| Ethylbenzene | X | X | X | X | 142 |
| m-Xylene | X | X | X | X | 136 |
| p-Xylene | X | X | X | X | 136 |
| o-Xylene | X | X | X | X | 136 |
| Styrene | X | X | X | X | 135 |
| 1,1,2,2,-Tetrachloroethane | X | X | X | X | 84 |
| 1,3,5-Trimethylbenzene | X | X | X | X | 146 |
| 1,2,4-Trimethylbenzene | X | X | X | X | 142 |
| m-Dichlorobenzene | X | X | X | X | 149 |
| o-Dichlorobenzene | X | X | X | X | 155 |
| p-Dichlorobenzene | X | X | X | X | 141 |
| 1,2,4-Trichlorobenzene | X | X | X | X | 150 |
| Hexachlorobutadiene | X | X | X | X | 88 |
| Bromobenzene | X |  |  | X | 119 |
| Bromodichloromethane | X |  |  | X | 40 |
| Bromoform | X |  |  | X | 47 |
| n-Butylbenzene | X |  |  | X | 127 |
| tert-Butylbenzene | X |  |  | X | 128 |
| sec-Butylbenzene | X |  |  | X | 128 |
| 2-Chlorotoluene | X |  |  | X | 133 |
| 4-Chlorotoluene | X |  |  | X | 136 |
| 1,2-Dibromo-3-Chloropropane | X |  |  | X | 36 |
| Dibromochloromethane | X |  |  | X | 36 |
| Bromochloromethane | X |  |  | X | 57 |
| 1,2-Dibromoethane | X |  |  | X | 58 |
| Dibromomethane | X |  |  | X | 70 |
| 2,2-Dichloropropane | X |  |  | X | 6 |
| 1,3-Dichloropropane | X |  |  | X | 61 |
| 1,1-Dichloropropene | X |  |  | X | 45 |
| Isopropylbenzene | X |  |  | X | 114 |
| p-Isopropyltoluene | X |  |  | X | 131 |
| Naphthalene | X |  |  | X | 251 |
| n-Propylbenzene | X |  |  | X | 139 |
| 1,1,1,2-Tetrachloroethane | X |  |  | X | 78 |
| 1,2,3-Trichlorobenzene | X |  |  | X | 149 |
| 1,2,3-Trichloropropane | X |  |  | X | 104 |
| Acetone | X |  |  |  |  |
| Acrylonitrile | X |  |  | X | 9 |
| 2-Butanone | X |  |  |  |  |
| Carbon Disulfide | X |  |  | X | 1 |
| Chloroacetonitrile | X |  |  |  |  |
| 1-Chlorobutane | X |  |  | X | 23 |
| trans-1,4-Dichloro-2-Butene | X |  |  | X | 44 |
| 1,1-Dichloropropanone | X |  |  |  |  |
| Diethyl Ether | X |  |  | X | 16 |
| Ethyl Methacrylate | X |  |  | X | 13 |
| Hexachloroethane | X |  |  | X | 86 |
| 2-Hexanone | X |  |  | X | 10 |
| Methacrylonitrile | X |  |  | X | 11 |
| Methacrylate | X |  |  | X | 10 |
| Methyl Iodide | X |  |  | X | 18 |
| Methylmethacrylate | X |  |  | X | <1 |
| 4-Methyl-2-Pentanone | X |  |  | X | 20 |
| Methyl-Tert-Butyl Ether | X |  |  | X | <1 |
| 2-Nitropropane | X |  |  |  |  |
| Pentachloroethane | X |  |  | X | 16 |

TABLE-continued

| Organic Component | 524.2-R4 | TO-14 | TO-17 | Recovered | Area Counts per ppb |
|---|---|---|---|---|---|
| Propionitrile | X | | | | |
| Nitrobenzene | X | | | | <1 |
| Tetrahydrofuran | X | | | X | 6 |

What is claimed is:

1. A method of sequential adsorption, storage, and desorption of a multiplicity of organic compounds contained in a gas stream at concentrations from about 0.5 parts per billion to about 100 parts per million with retention of the relative proportions of each of said organic compounds in each of the adsorption, storage, and desorption cycles comprising flowing said gas stream through an adsorbent bed comprising a clay to adsorb said organic compounds in amounts which are the same proportionate portion as each are found in said gas stream, storing the adsorbed organic compounds in the clay, desorbing said organic compounds in substantially the same proportionate portion as each are stored in the clay at a temperature between about 50° C. and about 600° C. for a time sufficient to desorb organic compounds, and removing residual organic compounds from the clay by heating the clay in a flowing gas at a temperature of at least 450° C. for a time sufficient to remove residual organic compounds from the clay.

2. The method of claim 1 wherein the clay is selected from the group consisting of attapulgite clay, attapulgite clay modified with tetrasodiumpyrophosphate, carboxymethylcellulose, and the combination thereof, kaolin ciay, kaolin clay modified with tetrasodiumpyrophosphate, carboxymethylcellulose, and the combination thereof, and mixtures thereof.

3. The method of claim 1 further characterized in having a water removing adsorbent placed upstream of the clay adsorbent bed.

4. The method of claim 1 further characterized in that the clay is present in combination with another adsorbent bed containing adsorbent selected from the group consisting of silicalite, dealuminated zeolite Y, and fumed silica.

* * * * *